US006229475B1

(12) United States Patent
Woolley

(10) Patent No.: US 6,229,475 B1
(45) Date of Patent: May 8, 2001

(54) PULSE DOPPLER RADAR SYSTEM WITH IMPROVED CLUSTER TARGET RESOLUTION CAPABILITY

(75) Inventor: Richard L. Woolley, Canoga Park, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 07/042,751

(22) Filed: Apr. 27, 1987

(51) Int. Cl.[7] .............................. G01S 13/66; G01S 7/487
(52) U.S. Cl. ................................ 342/93; 342/90; 342/91; 342/159; 342/194; 342/196
(58) Field of Search ............................ 342/90, 139, 146, 342/147, 159, 160, 175, 192, 195, 93–103, 149–154, 194, 196, 91, 92

(56) References Cited

U.S. PATENT DOCUMENTS

| | | | |
|---|---|---|---|
| 3,201,788 | * 8/1965 | Hertwig | 342/95 |
| 3,212,083 | * 10/1965 | Hinchman | 342/95 |
| 3,614,784 | * 10/1971 | Richmond | 342/160 |
| 3,707,718 | * 12/1972 | Ames | 342/160 X |
| 3,952,304 | * 4/1976 | Broniwitz et al. | 342/95 |
| 4,023,170 | * 5/1977 | Buss | 342/160 X |
| 4,062,012 | * 12/1977 | Colbert et al. | 342/95 X |
| 4,079,376 | * 3/1978 | Kirk, Jr. | 342/159 X |
| 4,110,756 | * 8/1978 | Kaszerman | 342/95 |
| 4,450,446 | * 5/1984 | Clancy et al. | 342/159 X |
| 4,486,756 | * 12/1984 | Peregrim et al. | 342/194 X |
| 4,559,537 | * 12/1985 | Pearson, Jr. et al. | 342/159 X |

* cited by examiner

*Primary Examiner*—Bernarr E. Gregory
(74) *Attorney, Agent, or Firm*—David W. Collins; Andrew J. Rudd; Glenn H. Lenzen, Jr.

(57) ABSTRACT

A radar processing system is disclosed with an improved cluster target resolution capability. The invention provides a system and method for processing radar returns and generating first and second contiguous range/doppler cells. Within the cells, first and second dichotomous angle measurements corresponding to radar returns in the first and second contiguous range/doppler cells are derived. An adaptive threshold is then applied to the angle measurements to determine whether the first and second measurements correspond to first and second targets in the first and second range/doppler cells respectively.

8 Claims, 3 Drawing Sheets

FIG. 4
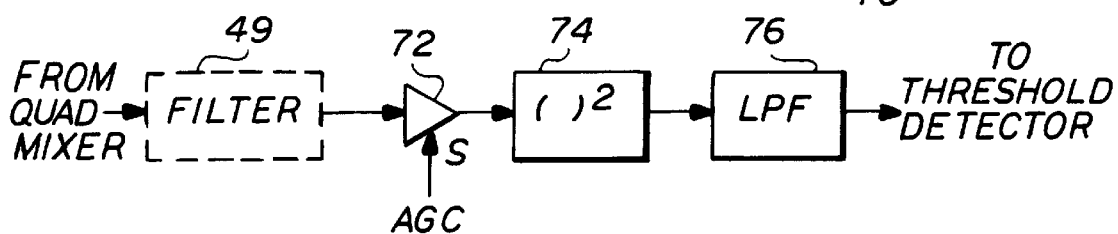
FIG. 5
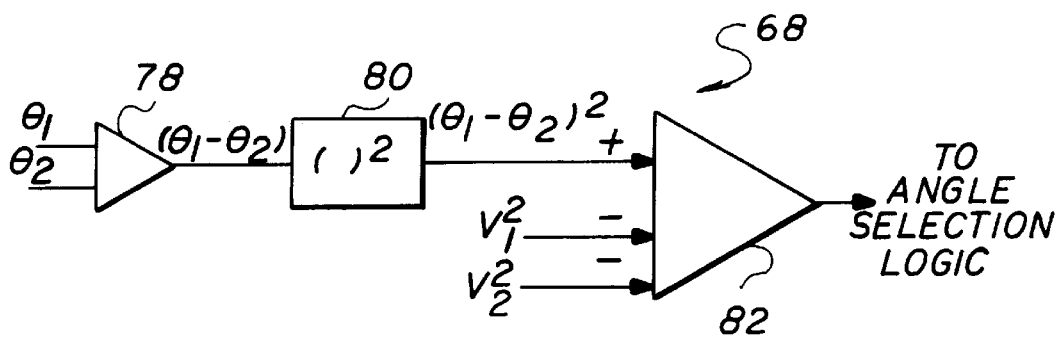
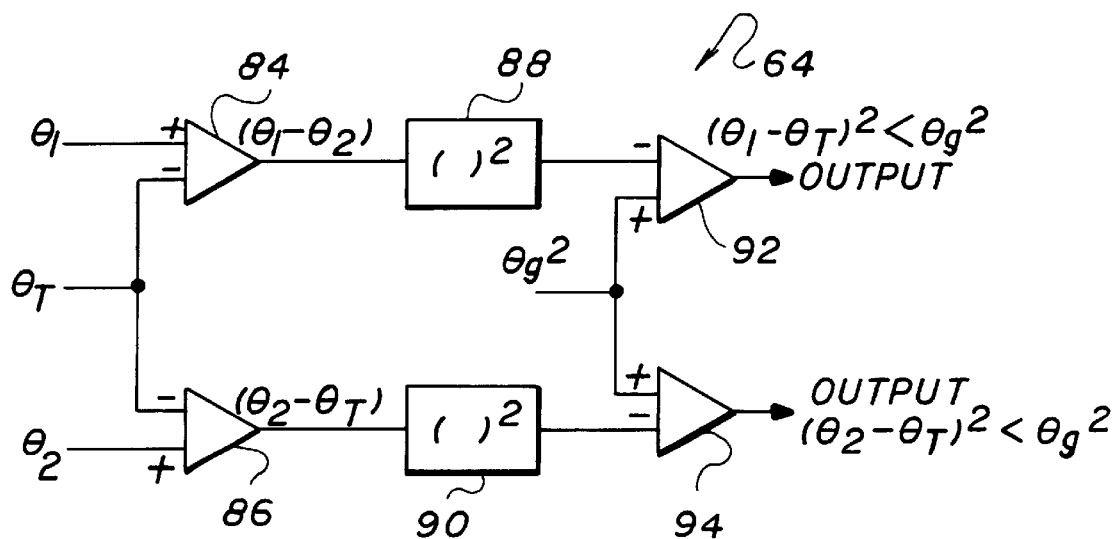
FIG. 6

PULSE DOPPLER RADAR SYSTEM WITH IMPROVED CLUSTER TARGET RESOLUTION CAPABILITY

BACKGROUND OF THE INVENTION

1. Field of the Invention

The present invention relates to tracking and guidance systems. More specifically, the present invention relates to pulse doppler radar systems having a cluster target resolution capability.

While the present invention is described herein with reference to a illustrative embodiment for a particular application, it is understood that the invention is not limited thereto. Those having ordinary skill in the art and access to the teachings provided herein will recognize additional modifications, applications, and embodiments within the scope thereof.

2. Description of the Related Art

In many applications, it is desirable to identify and track one target among a group or"cluster" of targets. Accordingly, many modern tracking and guidance systems include a cluster target resolution capability. Most such current systems utilize range rate or doppler data and employ a dichotomous angle processing technique.

In a typical doppler only dichotomous angle processing scheme, the amplitude of radar returns corresponding to two targets traveling at the same velocity (and therefore having the same doppler or range rate) are compared. Conventional angle detection techniques are employed to ascertain the angle of the target having the highest amplitude. The angle measurements are averaged over a predetermined time interval to remove the effects of scintillation and additive noise. If the processing were mathematically ideal, the average measurement would be the angle to the target in the resolution cell with the largest amplitude.

Unfortunately, there are many shortcomings associated with the conventional dichotomous processing technique for cluster target resolution. First, the conventional dichotomous processing technique is a two target technique. As such, systems employing a dichotomous processing technique experience considerable difficulty in discriminating between more than two targets at the same velocity. Secondly, the dichotomous processing scheme has difficulty discriminating between two targets at the same velocity and at or near the same angle and range. Thirdly, the dichotomous processing scheme is limited in response time by the fact that the angle measurement on a selected target can only be obtained when the natural amplitude scintillation produced a stronger return on that target. Finally, the effects of additive noise on conventional dichotomous processing schemes is such as to limit the resolution of the system within the constraint of a specified false alarm probability.

There is therefore a need in the art for a processing system having an improved cluster target resolution capability. Ideally, the system would employ a high speed, high resolution processing scheme capable of discriminating between multiple closely spaced targets simultaneously.

SUMMARY OF THE INVENTION

The need in the art for an improved radar processing system is provided by the unique cluster target resolution capability of the present invention. In its simplest form, the invention provides a system and method for processing radar returns and generating first and second contiguous range/doppler cells. Within the cells, first and second dichotomous angle measurements corresponding to radar returns in the first and second contiguous range/doppler cells are derived. An adaptive threshold is then applied to the angle measurements to determine whether the first and second measurements correspond to first and second targets in the first and second range/doppler cells respectively.

BRIEF DESCRIPTION OF THE DRAWINGS

FIG. 4 shows an illustrative implementation of the variance estimator of the present invention.

FIG. 5 shows an illustrative implementation of the threshold detector of the present invention.

FIG. 6 shows an illustrative implementation of the angle selection and gating logic of the present invention.

DESCRIPTION OF THE INVENTION

The present invention is described herein with reference to an illustrative implementation. Those of ordinary skill in the art will recognize that the teachings of the present invention may be appreciated in analog, digital, or software implementations.

Figure 1:
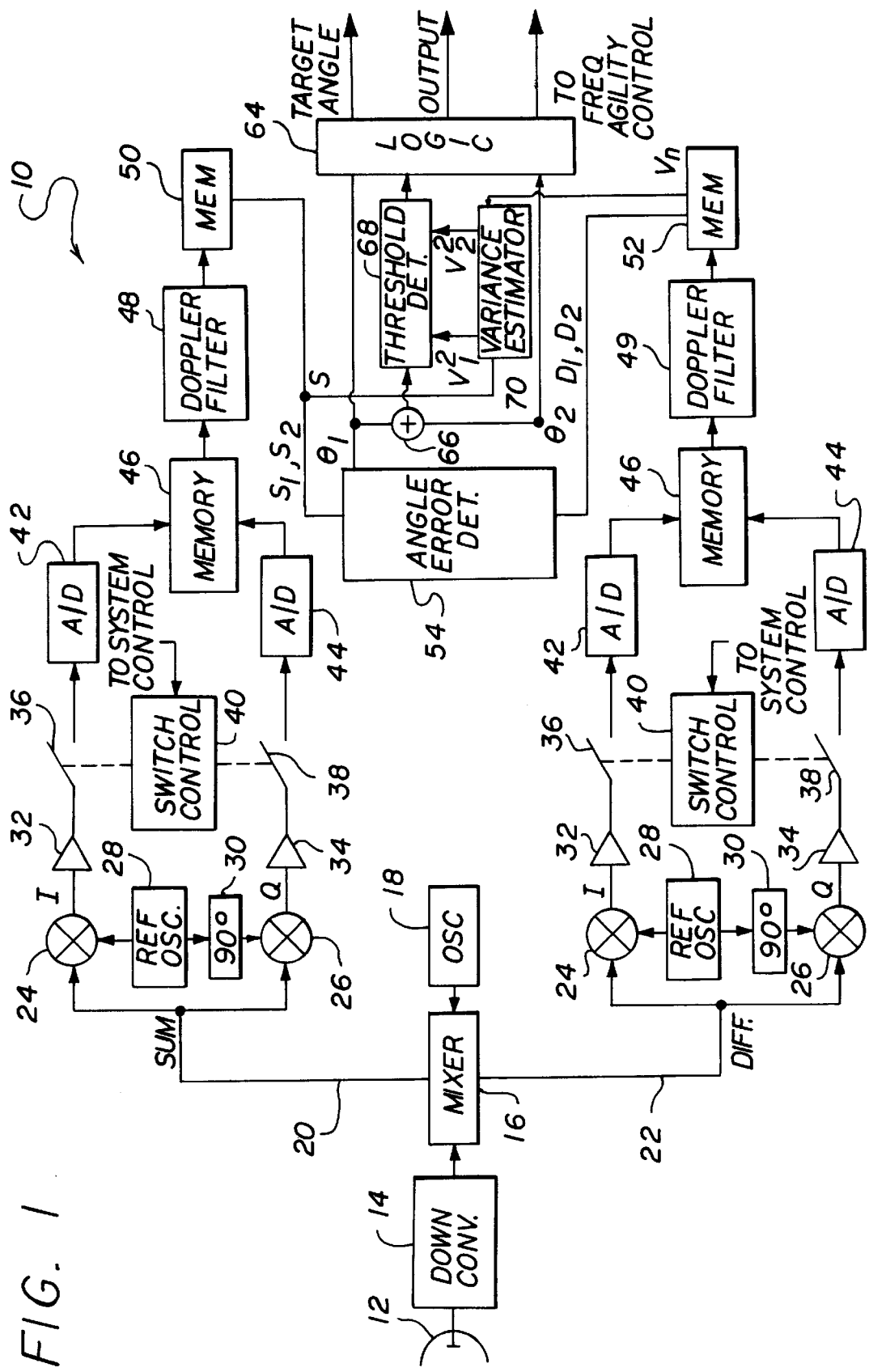
FIG. 1 is an operational block diagram of a radar signal processing system incorporating the teachings of the present invention.

FIG. 1 shows the salient portions of a radar processing system 10 incorporating the teachings of the present invention. The system 10 includes a conventional monopulse radar antenna 12 which provides rf radar signals to a downconverter 14. The output of the downconverter 14 is input to a mixer 16 driven by a local oscillator 18. Sum and difference receiver channels are provided although the particular implementation is not critical to the invention. It is understood that the channels may be processed separately or multiplexed as is common in the art. Nor is the invention limited to the implementation shown below by which range/doppler cells are generated.

For a single channel, the mixer 16 feeds the sum channel 20 and the difference channel 22. The components of the sum channel only will be described below as the two channels 20 and 22 are substantially identical. In each channel, I and Q signals are generated by quad mixers 24 and 26 respectively. The I mixer 24 is supplied with a signal by a reference oscillator 28 while the Q mixer is supplied with the same signal shifted in phase by a 90 degree phase shifter 30. The outputs of the quad mixers 24 and 26 are amplified by low noise amplifiers 32 and 34 and sampled by switches 36 and 38 respectively.

The switches are actuated by a switch control 40. The switch control 40 closes the switches 36 and 38 once per range gate (or interval) for each range under the command of a conventional radar system controller (not shown). The pulses are digitized by A/D converters 42 and 44. The A/D converters 42 and 44 provide n samples of the received return per range gate. The n samples are stored in a first memory 46 for input to a doppler filter 48 or 49. The doppler filters 48 and 49 operate on the n samples and determine the spectrum of the received radar return. Doppler filters, or digital filter banks, are well known in the art and may be implemented with fast fourier transform (FFT) filters (see for example the *Radar Handbook* by M. I. Skolnik, McGraw Hill Publishing Co., copr. 1970, pp. 35-14 thru 35-16).

The doppler filter 48 provides an output indicative of the velocity of the tracked vehicles. This output is stored at an address in the doppler memory 50 or 52 corresponding to each range gate. Thus, a plurality of cells are provided, one for each range interval and doppler value. In each range cell a value is stored which represents the amplitude of the return at the corresponding range and doppler address.

Figure 2:
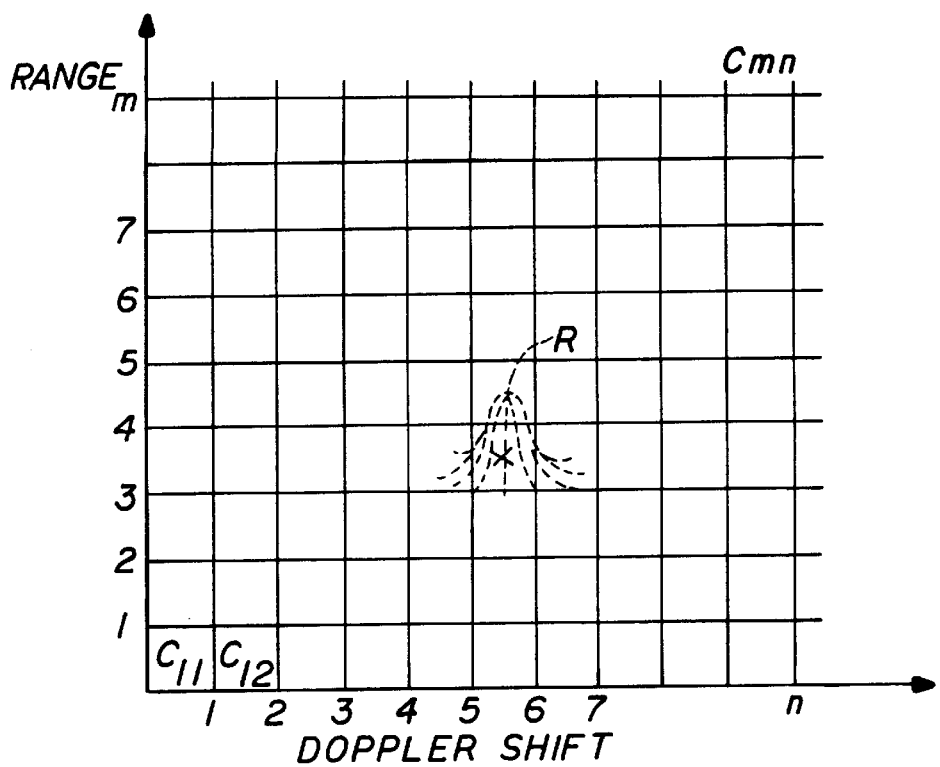
FIG. 2 illustrates range/doppler cells stored in a memory in the present invention.

The three dimensional map of FIG. 2 illustrates the information is stored in memory 50 or 52. Quantized returns are stored in the memory 50 or 52 in range/doppler cells $C_{mn}$ where 'm' is the range parameter and 'n' is the doppler shift parameter. By way of example, FIG. 2 illustrates the storage of a substantial return at the memory location for cell $C_{46}$. An analog representation of the return 'R' is shown in phantom in FIG. 2. It is understood that in a true three dimensional representation, where the amplitude parameter would be the z axis, the peak would extend out of the page.

As illustrated in FIG. 2, part of the return R would spillover into adjacent cells surrounding the center cell $C_{46}$. The range cells contiguous to cell $C_{46}$ are $C_{36}$ and $C_{56}$. The above-described elements of the system 10 thus provide means for processing radar returns and generating a multiplicity of range/doppler cells.

Sum signals $S_1$ and $S_2$ stored in the sum channel doppler memory 50 and difference signals $D_1$ and $D_2$ stored in the difference channel doppler memory 52 correspond to successive range samples and are input to a angle error detector 54 for processing according to a conventional dichotomous processing scheme. A significant difference in the technique of the present invention over that of the conventional technique, is that the dichotomous processing is performed on data that is also correlated in range. The range information provides an additional level of target discrimination over a conventional doppler only system. Two targets, or two groups of targets, may be discerned based on range and subsequently, if two targets exist within a cell, they may be discerned using conventional dichotomous processing techniques.

The present invention effectively exploits differences in target amplitudes, from one range gate to another, due to the transient response of the receiver, when there is a very small range separation between the targets, i.e., when the targets are not resolved in range. This allows both targets to be detected simultaneously in many instances as the present invention allows for simultaneous dichotomous processing on two consecutive range/doppler cells. By definition then, the target detected in the earlier range gate is closer, independent of its angle. The invention thus provides an additional degree of freedom over conventional doppler only processing techniques.

Angle error detectors are known in the art (see for example the *Radar Handbook* by M. I. Skolnik, supra, pp. 21-24 thru 21-29). In the preferred embodiment, the angle error detector is implemented digitally. That is, a microprocessor would generate the dot product of the I and Q signals for the sum and difference channels and solve equation 1 below for the cosine of the angle $O_1$ for a first range gate and $O_2$ for a second range gate.

$$D \cdot S/(\text{mag } S)^2 = (I_D I_S + Q_D Q_S)/\text{mag}(I_S^2 + Q_S^2) = ((\text{mag } D)/(\text{mag } S)) \cos P \quad [1]$$

$$= ((\text{mag } D)/(\text{mag } S)) \cos P$$

where $I_D$=I component for the difference channel,
$I_S$=I component for the sum channel,
$Q_D$=Q component for difference channel, $Q_S$=Q component for the sum channel,
$\text{mag}(I_S^2 + Q_S^2)$=magnitude of the sum of the squares of the I and Q components of the sum channel.
D=the vector representing the difference signal,
S=the vector representing the sum signal, and
P=the phase angle between the sum and difference vectors S and D.

Since the phase angle P is either 0 degrees or 180 degrees, equation 1 reduces to $\pm(\text{mag } D)/(\text{mag } S)$. This ratio is related to the pointing angle $\theta$ by the antenna parameter $k_\theta$:

$$\theta_i = (\text{mag } D_i)/k_\theta(\text{mag } S_i) \quad [2]$$

Figure 3:
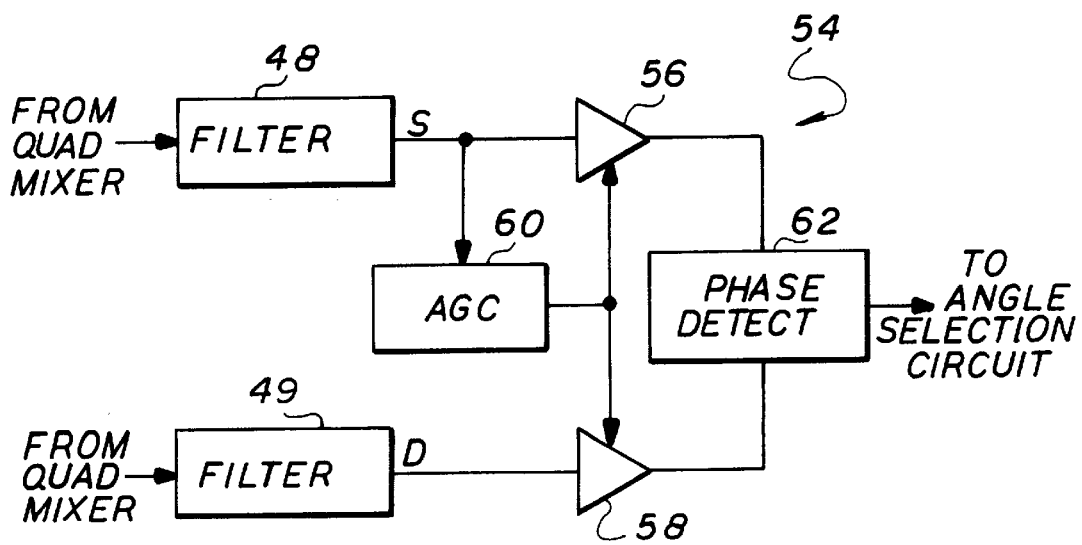
FIG. 3 shows an illustrative implementation of the angle error detector of the present invention.

Although the preferred implementation for the angle error detector 54 is digital, an illustrative analog implementation is shown in FIG. 3. Sum and difference signals S and D are received from the doppler filters 48 and 49 and amplified by sum and difference amplifiers 56 and 58. The gain of the amplifiers is controlled by the automatic gain control (AGC) circuit 60 which has a gain factor of V/S where V is a scale factor. The output of the first amplifier 56 is therefore equal to V and the output of the second amplifier is DV/S. The output of the phase detector 62 is $(V^2 D \cos P)/S$. If the scale factor $V^2$ is set equal to $1/k_\theta$, then the output of the phase detector is the pointing angle $\theta$.

The outputs of the angle error detector 54 are first and second pointing angles $\theta_1$ and $\theta_2$ corresponding to first and second contiguous range/doppler cells. The angle error detector 54 thus provides means for deriving first and second dichotomous angle measurements corresponding to radar returns in first and second contiguous range/doppler cells.

As shown in FIG. 1, the output angles $\theta_1$ and $\theta_2$ are provided to an angle selection and gating logic circuit 64. The angle $\theta_2$ is subtracted from the angle $\theta_1$ at a summer 66. The difference between the two angles is input to a threshold detector 68. Additional inputs to the threshold detector 68 are provided by a variance estimator 70. The output $v^2$ of the variance estimator 70 is related to the signal-to-noise ratio and is a measure of the noise associated with the measured pointing angles. The variance estimator 70 measures the energy $V_n$ in a range/doppler cell which contains only noise and divides it by a signal in the sum channel squared $S^2$. The variance estimator 70 thus implements equation 3 below:

$$v^2 = 1/2n\text{SNR} = V_n^2/2nS^2 \quad [3]$$

where n=is a number of samples in the average and SNR is the signal-to-noise ratio.

While this function may be realized digitally, FIG. 4 shows an illustrative analog implementation of the variance estimator 70. The noise voltage $V_n$ is supplied from a range/doppler cell containing only noise via the doppler filter 49 of the difference channel 22. The noise voltage is provided to an operational amplifier 72. The operational amplifier 72 has a gain of V/S. The output of the amplifier 72 is $V_n V/S$ and is supplied to a square law detector 74. The low pass filter 76 provides an average over n samples so that its output is equal to the scale factor squared times the variance: $V^2 v^2$. Variances $v_1^2$ and $v_{22}$ corresponding to the first and second range samples are supplied to the threshold detector 68.

In the preferred embodiment, the threshold detector 68 is implemented digitally. However, an illustrative analog implementation is shown in FIG. 5. The first and second target angles $\theta_1$ and $\theta_2$ are subtracted by a differential amplifier 78. The difference between the two angles is squared by a square law detector 80 and input to a second differential amplifier 82. If the difference between the two angles $\theta_1$ and $\theta_2$ is larger than the sum of the two variances $v_1^2$ $_{and}$ $v_2^2$ the output of the second differential amplifier 82 goes high indicating that two targets have been detected. When two targets are detected, both are analyzed by the angle detection logic 64 to determine if the angle of either corresponds to the target. If neither angle corresponds to the target, frequency agility is initiated to generate sufficient returns in the next measurement interval to provide new angles. Similarly, if only one angle is detected and it is not sufficiently close to the target angle, frequency agility is initiated.

While the angle selection and gating logic 64 is best implemented digitally, an illustrative analog implementation is shown in FIG. 6. The target angle $\theta_T$ is supplied externally to two differential amplifiers 84 and 86 the outputs of which represent the difference between the pointing angles $\theta_1$ and $\theta_2$ and the target angle $\theta_T$. (The target angle $\theta_T$ may be provided via a "track file" or assumed to be zero for the selected target via an angle tracking loop, as is known in the art.) The difference outputs are squared by square law detectors 88 and 90 and provided as negative inputs to additional differential amplifiers 92 and 94.

In the differential amplifiers 92 and 94 the squares of the difference signals are compared to the square of an angle gate $\theta_g^2$. (As is known in the art, the angle gate $\theta_g$ may be fixed or adaptive to the signal environment. Adaptive angle gating may be optimized based on the quality of the angle track and the measurement variance of the current data. This may be used to prevent track switching for the angle resolved targets.) A 'true' output from either amplifier 92 or 94 implies a measure on the selected target. That is, if $$(\theta_i - \theta_T)^2 < \theta_g^2 \quad [4]$$

then $\theta_i$ is deemed to be the angle to the selected target.

The outputs of the angle selection and gating logic 64 are processed in a conventional manner. The summer 66, variance estimator 70, threshold detector 68 and angle selection and gating logic 64 provide means for applying an adaptive threshold to angle measurements to determine whether first and second measurements correspond to first and second targets.

In operation, range/doppler cells are generated and dichotomous angle measurements are derived by averaging angle measurements for contiguous range cells having amplitude data. The angle measurements are averaged over a sufficient time interval such that the relative phase of two targets in the resolution cell would transverse pi radians or any multiple thereof. This assures true dichotomy. That is, this assures that the angle output is the angle of the target having the stronger return in the cell.

Next, an adaptive threshold is applied to determine whether the dichotomous angle measurements are derived from a single target or two targets. In this regard, the variance of each measurement is calculated and summed to provide a combined variance. The combined variance represents the variance for the difference between the two angles. The difference between the two measured angles is obtained and the square of the difference is compared to a multiple of the combined variance. (The multiple is determined by the allowable false alarm rate or probability.) This provides an indication whether one or two targets are detected.

The measured angles are compared to a target angle from an external file. If the difference between either of the measured angles is smaller than an angle gate, the measured angle is deemed to correspond to the target and is output for processing in a conventional manner. If the difference is larger than the angle gate, frequency agility is initiated to produce a favorable amplitude ratio for the selected target in at least one of the resolution cells. That is, amplitude scintillation is induced on both targets by dithering the radar transmission frequency.

Thus, the present invention has been described herein with reference to illustrative embodiments for a particular application. Those having ordinary skill in the art and access to the teachings provided herein will recognize additional modifications, applications and embodiments within the scope thereof. For example, the invention is not limited to use with conventional radar systems. The teachings of the present invention may be used with laser or other optical systems as well. Further, although the invention is described in a missile tracking an guidance system, it is to be understood that the invention is applicable to any application where the is a need to discriminate a target amongst other targets. In addition, the invention is not limited to two channels or range gates for simultaneous processing. Those of ordinary skill in the art will recognize that the teachings of the invention may be applied to as many channels and angles as system cost and design constraints permit. Finally, the invention is not limited to the illustrative implementation shown. While the preferred implementation is digital, analog implementations are shown for the purpose of illustration.

Thus, it is intended by the appended claims to cover any and all such modifications, applications, and embodiments.

Accordingly,

What is claimed is:

1. A radar system with an improved cluster target resolution capability comprising:
   first means for processing radar returns and generating first and second contiguous range/doppler cells;
   second means for deriving first and second dichotomous angle measurements corresponding to radar returns in said first and second contiguous range/doppler cells; and
   third means for applying an adaptive threshold to said angle measurements to determine whether said first and second measurements correspond to first and second targets said third means further including means for providing a noise estimate for said first and second angle measurements.

2. The radar system of claim 1 wherein said third means includes means for computing the difference between said first and second angle measurements and means for comparing the difference between said first and second angle measurements to said noise estimate to determine whether said first and second measurements correspond to first and second targets.

3. The radar system of claim 2 wherein said means for providing a noise estimate includes means for calculating the variance of each angle measurement.

4. The radar system of claim 3 wherein said means for providing a noise estimate further includes means for summing the variance of said first and second angle measurements to derive a combined variance.

5. The radar system of claim 4 wherein said third means includes means for computing the difference between said first and second angle measurements and means for comparing the difference between said first and second angle measurements to said combined variance to determine whether said measurements correspond to first and second targets.

6. A radar system with an improved cluster target resolution capability comprising:

first means for processing radar returns and generating first and second contiguous range/doppler cells;

second means for deriving first and second dichotomous angle measurements corresponding to radar returns in said first and second contiguous range/doppler cells;

third means for selectively dithering the frequency of said radar transmission to vary the amplitude ratio of the radar returns in the first and second range/doppler cells; and fourth means for applying an adaptive threshold to said angle measurements to determine whether said first and second measurements correspond to first and second targets, said fourth means including means for calculating the variance of each angle measurement to provide a combined variance, said fourth means further including means for computing the difference between said first and second angle measurements and means for comparing the difference between said first and second angle measurements to said combined variance.

7. The radar system of claim 6 further including means for adapting said threshold it accordance with a specified false alarm probability.

8. A method for processing radar returns to provide an improved cluster target resolution capability including the steps of:

a) generating first and second contiguous range/doppler cells;

b) for deriving first and second dichotomous angle measurements corresponding to radar returns in said first and second contiguous range/doppler cells;

c) providing an estimate of the noise associated with said first and second angle measurements;

d) comparing the first angle measurement to said second angle measurement to provide an indication of the difference therebetween; and e) comparing the difference between said first and second angle measurements to said noise estimate to determine whether first and second targets exist in said first and second range/doppler cells.

* * * * *